United States Patent [19]

Sawada et al.

[11] Patent Number: 5,262,084
[45] Date of Patent: Nov. 16, 1993

[54] LIQUID CRYSTAL COMPOSITION

[75] Inventors: Shinich Sawada; Tetsuya Matsushita; Toyoshiro Isoyama; Hideo Saito, all of Chiba, Japan

[73] Assignee: Chisso Corporation, Osaka, Japan

[21] Appl. No.: 819,659

[22] PCT Filed: Dec. 14, 1988

[86] PCT No.: PCT/JP88/01266

§ 371 Date: Aug. 8, 1989

§ 102(e) Date: Aug. 8, 1989

[87] PCT Pub. No.: WO89/05846

PCT Pub. Date: Jun. 29, 1989

Related U.S. Application Data

[63] Continuation of Ser. No. 397,437, Aug. 8, 1989, abandoned.

[30] Foreign Application Priority Data

Dec. 14, 1987 [JP] Japan .................. 62-315574

[51] Int. Cl.$^5$ .................. C09K 19/30; C09K 19/52; C09K 19/34
[52] U.S. Cl. .................. 252/299.63; 252/299.01; 252/299.61
[58] Field of Search .................. 252/299.01, 299.61, 252/299.63; 359/105, 106

[56] References Cited

U.S. PATENT DOCUMENTS

| | | | |
|---|---|---|---|
| 4,340,498 | 7/1982 | Sugimori et al. | 252/299 |
| 4,405,488 | 9/1983 | Sugimori et al. | 252/299 |
| 4,422,951 | 12/1983 | Sugimori et al. | 252/299 |
| 4,439,340 | 3/1984 | Kojima et al. | 252/299 |
| 4,507,222 | 3/1985 | Inoue et al. | 252/299.63 |
| 4,536,321 | 8/1985 | Sugimori et al. | 252/299 |
| 4,629,581 | 12/1986 | Petrzilka et al. | 252/299.63 |
| 4,676,604 | 6/1987 | Petrzilka | 252/299.63 |
| 5,013,478 | 5/1991 | Petrzilka | 252/299.63 |

FOREIGN PATENT DOCUMENTS

| | | |
|---|---|---|
| 123907 | 7/1984 | European Pat. Off. . |
| 0232052 | 8/1987 | European Pat. Off. . |
| 0258868 | 3/1988 | European Pat. Off. . |
| 0281065 | 9/1988 | European Pat. Off. . |

| | | |
|---|---|---|
| 59-70624 | 4/1984 | Japan . |
| 59-176221 | 10/1984 | Japan . |
| 60-69049 | 4/1985 | Japan . |
| 60-204769 | 10/1985 | Japan . |
| 61-5031 | 1/1986 | Japan . |
| 62-13484 | 1/1987 | Japan . |

Primary Examiner—Philip Tucker
Attorney, Agent, or Firm—Leydig, Voit & Mayer

[57] ABSTRACT

The present invention provides a liquid crystal composition having a high clearing point, a low viscosity, a desired Δn ($n_e$-$n_o$) and an improved steepness of voltage-transmittance properties in the display of a supertwisted birefringence effect mode, and a liquid crystal display element having excellent contrast in which the liquid crystal composition is utilized.

The present invention is directed to a liquid crystal composition characterized by containing a first component comprising a compound represented by the general formula

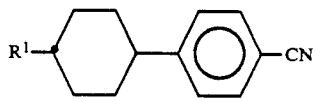

wherein $R^1$ is an alkenyl group having 2 to 8 carbon atoms,
and a second component comprising a compound represented by the formula

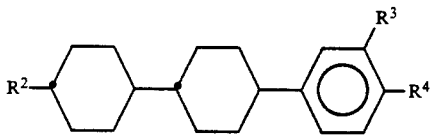

wherein $R^2$ is an alkyl group having 1 to 8 carbon atoms, $R^3$ is H or F, $R^4$ is an alkoxy group, an alkyl group having 1 to 8 carbon atoms, F or a CN group.

Furthermore, the present invention is also directed to a liquid crystal display element using the aforesaid liquid crystal composition.

12 Claims, No Drawings

LIQUID CRYSTAL COMPOSITION

This application is a continuation of application Ser. No. 07/397,437, filed Aug. 8, 1989 now abandoned.

TECHNICAL FIELD

The present invention relates to a liquid crystal composition. More particularly, the present invention relates to a liquid crystal composition which can be used in high multiplex display devices utilizing a supertwisted birefringence effect mode, and a liquid crystal display element in which the aforesaid liquid crystal composition is used.

BACKGROUND TECHNIQUES

In recent year, with the rapid development of information instruments, particularly with the advancement of portable terminal equipments, demand for display devices which are miniature, thin and of a low-consumption power type and which have such display capacity and display performance as in conventional CRT's has increased. In reply to the requirements of small size, small wall thickness and low power consumption, watches, portable electronic calculators and display terminal equipment of about 1/100 duty or less heretofore have been used in which the multiplex drive of a TN type liquid crystal cell having a twist angle of 90° is utilized, but it is difficult in principle to further increase the duty number, because this leads to the deterioration of the display performace.

On the other hand, the supertwisted birefringence effect mode (hereinafter referred to simply as "SBE mode") utilizing the birefringence effect of a liquid crystal cell has been suggested in which the widest twist angle for providing bistable properties based on electro-optical characteristics of a chiral nematic liquid crystal is set so as to be in the range of 180° to 270°. T. J. Scheffer et al. have reported that the SBE mode can provide a matrix display which can drive as in the usual TN mode having a twist angle of 90°, that is, a matrix display which can drive by a fast scan addressing mode in response to the root-meansquare value of an applied voltage, and that the SBE mode has excellent contrast and a wider visual angle than the 90° twisted TN display [see T. J. Scheffer and J. Nehring, Appl. Phys. Lett., 45, 1021 (1984)].

Characteristics necessary for the liquid crystal composition used in the SBE mode display element are as follows:

(1) Voltage-transmittance properties should be steep.
(2) The nematic-isotropic liquid phase transition temperature should be high.
(3) The suitable optical anisotropy value (hereinafter referred to simply as "$\Delta n$") should be obtained in accordance with the thickness (hereinafter referred to simply as "d") of a cell ($\Delta n = n_e - n_o$ wherein $n_e$ is the refractive index of the extraordinary ray and $n_o$ is the refractive index of the ordinary ray).
(4) The viscosity should be low.

In the SBE mode, the above-mentioned characteristic (2) is necessary to inhibit a display from coloring owing to the dependence of $\Delta n$ on temperature, and it is desired that the clearing point be as high as possible. The above characteristics (4) is particularly effective to shorten a response time in the liquid crystal cell having the SBE mode.

An object of the present invention is to provide a nematic liquid crystal composition having a high clearing point, a low viscosity, an ability to obtain a desired $\Delta n$, and an improved steepness of voltage-transmittance properties in the SBE mode display. Another object of the present invention is to provide a liquid crystal display element having a steep voltage-transmittance curve and good contrast in the SBE mode.

DISCLOSURE OF THE INVENTION

The present inventors have researched intensively with the intention of solving the above-mentioned problems. As a result, they have found that the above-mentioned specific values, the improvement of which is demanded, can be improved noticeably by a liquid crystal composition prepared by mixing a compound represented by the general formula (I) with a compound represented by the general formula (II), or with the compounds represented by the general formulae (II) and (III), or with compounds represented by the general formulae (II), (III) and at least one of compounds represented by the general formulae (IV), (V), and on the basis of this knowledge, the present invention has been achieved.

That is, a first feature of the present invention is directed to a liquid crystal composition which contains a first component comprising a compound represented by the general formula (I)

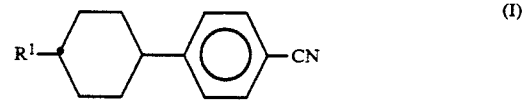

wherein $R^1$ is an alkenyl group having 2 to 8 carbon atoms, and a second component comprising a compound represented by the general formula (II)

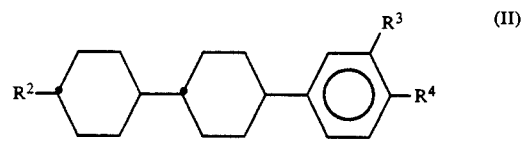

wherein $R^2$ is an alkyl group having 1 to 8 carbon atoms, $R^3$ is H or , $R^4$ is an alkoxy group, an alkyl group having 1 to 8 carbon atoms, F or a CN group,
and it is preferred that the amount of the first component is from 10 to 50% by weight and that of the second component is from 30 to 60% by weight.

Furthermore, the liquid crystal composition of the present invention may contain, in addition to the first and second components, a third component, i.e., at least one compound represented by the formula (III)

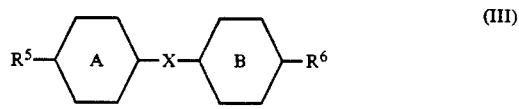

wherein $^5$ is an alkyl group or an alkoxymethyl group, each having 1 to 8 carbon atoms, $R^6$ is an alkyl group, an alkoxy group, each having 1 to 8 carbon atoms of F,

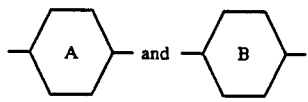

each independently represents

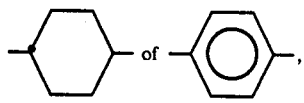

and X is a single bond, —COO— or —C≡C—, and the amount of the first component is from 10 to 50% by weight, that of the second component is from 30 to 60% by weight, and that of the third component is from 15 to 40% by weight.

Another embodiment of the liquid crystal composition regarding the present invention may contain, in addition to the first, second and third components, a fourth component, i.e., at least one selected from the group consisting of compounds represented by the formula (IV)

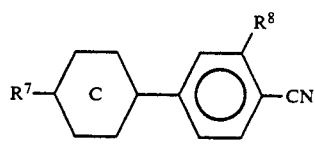

wherein $R^7$ is an alkoxy group or an alkyl group having 1 to 8 carbon atoms, $R^8$ is H or F, and

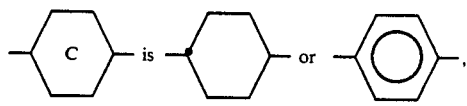

and compounds represented by the formula (V)

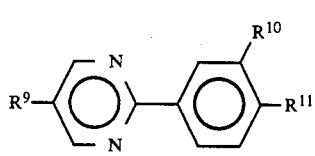

wherein $R^9$ is an alkyl group having 1 to 8 carbon atoms, $R^{10}$ is H or F, and $R^{11}$ is F, and it is preferred that the amount of the first component is from 10 to 50% by weight, that of the second component is from 30 to 60% by weight, that of the third component is from 15 to 40% by weight, and that of the fourth component is from 10 to 40% by weight.

As the second component of the present invention, among the compounds represented by the general formula (II), preferable ones are compounds represented by the general formula (VI)

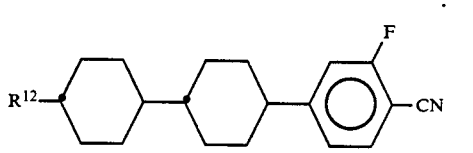

wherein $R^{12}$ is an alkyl group having 1 to 8 carbon atoms, and compounds represented by the general formula (VII)

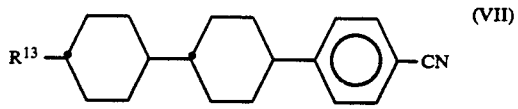

wherein $R^{13}$ is an alkyl group having 1 to 8 carbon atoms.

As the third component of the present invention, among the compounds represented by the general formula (III), particularly preferable ones are compounds represented by the general formula (VIII)

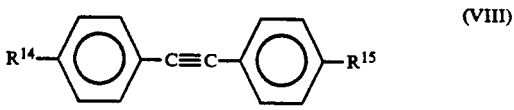

wherein each of $R^{14}$ and $R^{15}$ is an alkyl group having 1 to 8 carbon atoms, and compounds represented by the general formula (IX)

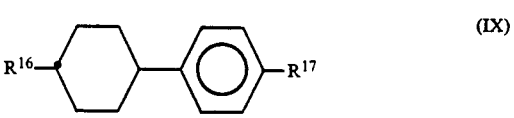

wherein $R^{16}$ is an alkyl group having 1 to 8 carbon atoms, and $R^{17}$ is an alkoxy group having 1 to 8 carbon atoms.

As the fourth component of the present invention, among the compounds represented by the general formula (IV), particularly preferable ones are compounds represented by the general formula (X)

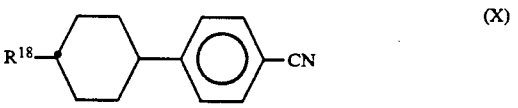

wherein $R^{18}$ is an alkyl group having 1 to 8 carbon atoms.

The liquid crystal composition of the present invention can contain, in addition to the above-mentioned compounds represented by the formulae (I) to (X), another nematic liquid crystal or liquid crystal compound for the purpose of adjusting a threshold voltage, a liquid crystal temperature range, a viscosity and the like, so long as it does not hinder the objects of the present invention. Preferable typical examples of such a compound include 2-[4-(trans-4-alkylcyclohexyl)phenyl]-5-alkylpyrimidine,
2-(4-alkylphenyl)-5-alkylpyrimidine,
4-(trans-4-alkylcyclohexyl)-4'-alkylbiphenyl,
trans-4-alkylcyclohexyltrans-4-alkylcyclohexane carboxylate, and
4''-alkyl-4-cyanoterphenyl.

A second feature of the present invention is directed to a liquid crystal display element characterized by using a liquid crystal composition which contains a first component comprising a compound represented by the general formula (I)

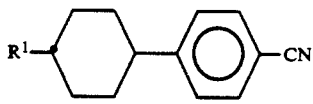

wherein $R^1$ is an alkenyl group having 2 to 8 carbon atoms, and a second component comprising a compound represented by the general formula (II)

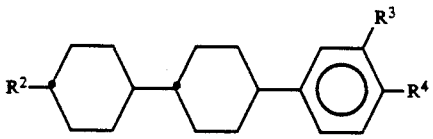

wherein $R^2$ is an alkyl group having 1 to 8 carbon atoms, $R^3$ is H or F, $R^4$ is an alkoxy group, an alkyl group having 1 to 8 carbon atoms, F or a CN group, and it is preferred that the amount of the first component in the aforesaid composition is from 10 to 50% by weight and that of the second component is from 30 to 60% by weight.

Other embodiments of the liquid crystal display element regarding the present invention include a liquid crystal display element using a liquid crystal composition which comprises the first, second and third components, and a liquid crystal display element using a liquid crystal composition which comprises the first, second, third and fourth components. Furthermore, amounts of the respective components used in each liquid crystal display element are preferably as mentioned above in the previous description about the liquid crystal of the present invention.

A nematic-isotropic transition point (hereinafter referred to simply as "clearing point") of the compound (Japanese Patent Laid-open Publication No. 176221/1984) represented by the formula (I) as the first component of the present invention is mostly distributed in the range of 53.8° to 74.5° C. except for partially monotropic compounds. With regard to extrapolated values of a mixture at 25° C., 15% by weight of which is dissolved in a phenylcyclohexane composition Zli-1083 made by Merck & Co., Inc., a dielectric anisotropy value (hereinafter referred to simply as "$\Delta\epsilon$") is from 9 to 16, a refractive index anisotropy value (hereinafter referred to simply as "$\Delta n$") is from 0.10 to 0.16, and a viscosity at 20° C. is from 20 to 30 cp.

The clearing points of the compounds represented by the formula (II) (Japanese Patent Laid-open Publication Nos. 165328/1982, 154135/1982, 152362/1984, 64626/1982 and 10552/1983) as the second component of the present invention are mostly distributed in the range of 85.4° to 246° C. With regard to extrapolated values of a mixture, 15% by weight of which is dissolved in the above-mentioned Zli-1083, $\Delta\epsilon$ at 25° C. is from 1 to 25.9, $\Delta n$ is from 0.10 to 0.16, and a viscosity at 20° C. is from 10 to 64 cp.

The compounds represented by the formula (III) (Japanese Patent Laid-open Publication No. 104844/1981, East German Patent No. 105701, Japanese Patent Laid-open Publication No. 167535/1983, U.S. Pat. No. 3,925,482 and the like) as the third component of the present invention characteristically have particularly low viscosities, and most of these viscosities are equal to or less than those of the compounds represented by the formulae (I) and (II).

The compound represented by the formula (IV) or (V) as the fourth component of the present invention characteristically has a great and positive $\Delta\epsilon$ value, and this is mostly equal to or more than those of the compounds represented by the formulae (I), (II) and (III).

The content of the first component which is the compound represented by the formula (I) in the present invention is suitably from 10 to 50% by weight. When the content of the first component is less than 10% by weight, the value of $\Delta\epsilon$ is relatively low as describe thus it is difficult at times to optionally lower the threshold voltage, depending upon a combination with the second and higher components. Furthermore, generally in a supertwisted birefringence mode, it is required that the clearing point of the liquid crystal be as high as possible, for example, about 75° C. or more so as to inhibit color change on a display due to temperature change, but when the content of the compound of a formula (I) which has the relatively low clearing point is in excess of 50% by weight, the clearing point of the prepared liquid crystal composition is noticeably low at times, depending upon a combination with the second and higher components. For this reason, in such a case, the dependence of $\Delta n$ on temperatures is great, and as a result, a light path d·$\Delta n$ of the birefringence changes, which undesirably affects the color on the display unpreferably.

The content of the second component which is the compound represented by the formula (II) in the present invention is suitably 30 to 60% by weight. When the content of a second component is less than 30% by weight, the satisfactory clearing point cannot be obtained, depending upon a combination with the first, third and higher components, and in consequence, the color on the display is reversely affected as described above. When the content of the second component is in excess of 60% by weight, the lower limit temperature of the nematic phase rises, and the operation temperature range on a lower temperature side is inconveniently limited.

The content of the third component which is the compound represented by the formula (III) in the present invention is suitably from 15 to 40% by weight. When the content of the third component is less than 15% by weight, the response time is undesirably prolonged, as the viscosity of the prepared liquid crystal composition increases, depending upon a combination with the first, second and higher components. Inversely, when it is more than 40% by weight, a satisfactory clearing point cannot be obtained and the dependence of $\Delta n$ on temperatures is great, and as a result, the light path d·$\Delta n$ of the birefringence changes, which adversely affects the color on the display.

The content of the fouth component which is the compound represented by the formula (IV) or (V) in the present invention is suitably from 10 to 40% by weight. When the content of the fourth component is less than 10% by weight, it is difficult at times to optionally lower the threshold voltage, depending upon the combination with the first, second and third components. Inversely, when it is more than 40% by weight, a satisfactory clearing point cannot be obtained and the dependence of $\Delta n$ on temperatures is great, and as a result, the light path d·Δn of the birefringence changes, which adversely affects the color on the display.

As elucidated by the undermentioned examples, the liquid crystal composition of the present invention is equal to or better than a conventional liquid crystal composition in points of characteristics such as a nematicisotripic liquid phase transition temperature, a refractive index anisotropy value in accordance with a cell thickness and a threshold voltage. In addition, the liquid crystal composition of the present invention has a low viscosity, excellent steepness of voltage-transmittance properties in an SBE mode liquid crystal display element and high multiplex properties, and therefore it can provide the liquid crystal display elements having excellent contrast.

BEST EMBODIMENTS TO PRACTICE THE PRESENT INVENTION

The present invention will be described hereinafter in detail with reference to the following examples, but it should not be limited to these examples.

In the present invention, the steepness of voltage-transmittance properties can be defined by the formula (1)

$$\alpha = V_{80}/V_{10} \quad (1)$$

wherein $V_{10}$ and $V_{80}$ are voltages when transmittances of light in a light axis direction perpendicular to the surface of a display are 10% and 80%, respecitvely, and $V_{10}$ is regarded as a threshold voltage.

Therefore, this formula indicates that the closer to 1 the parameter $\alpha$ is, the steeper voltage-brightness characteristics are. A parameter $N_{max}$ which denotes a multiplex number can be defined by the formula (2):

$$N_{max} = \left( \frac{\alpha^2 + 1}{\alpha^2 - 1} \right)^2 \quad (2)$$

This formula indicates that the greater the $N_{max}$ is, the greater the multiplex number is.

In the following, amounts of components are based on % by weight.

EXAMPLE 1

A liquid crystal composition was prepared from first components, i.e., the following four compounds of the formula (I):

| | |
|---|---|
| 4-[trans-4-(1-butenyl)cyclohexyl]benzonitrile | 10% |
| 4-[trans-4-(1-pentenyl)cyclohexyl]benzonitrile | 10% |
| 4-[trans-4-(3-butenyl)cyclohexyl]benzonitrile | 15% |
| 4-[trans-4-(3-pentenyl)cyclohexyl]benzonitrile | 15% | and second components, i.e., the following six compounds of the formula (II):

| | |
|---|---|
| 4-[trans-4-(trans-4-ethylcyclohexyl)cyclohexyl]-benzonitrile | 4% |
| 4-[trans-4-(trans-4-propylcyclohexyl)cyclohexyl]-benzonitrile | 6% |
| 4-[trans-4-(trans-4-propylcyclohexyl)cyclohexyl]-2-fluorobenzonitrile | 10% |
| 4-[trans-4-(trans-4-propylcyclohexyl)cyclohexyl]-fluorobenzene | 6% |
| 4-[trans-4-(trans-4-propylcyclohexyl)cyclohexyl]-toluene | 8% |
| 4-[trans-4-(trans-4-propylcyclohexyl)cyclohexyl]-propylbenzene | 16%. |

In this liquid crystal composition, the clearing point was 118.6° C., the refractive index anisotropy value was 0.132, and viscosity at 20° C. was 28.2 cp. Next, a chiral material (trade name S-811; made by Merck & Co., Inc.) was added to the above-mentioned composition, and this composition was then enclosed, under conditions of d·Δn=900 nm and d/P-=0.5, in a cell carrying a rubbed polyimide aligning film on an opposite plane transparent electrode and having a small tilt angle (<3°) and a twisted angle of 180°. In these formulae, P is an inherent helical pitch of the chiral nematic liquid crystal and d is the thickness of the cell, i.e., the distance between a pair of electrodes. Afterward, characteristics were measured.

In the liquid crystal composition, a threshold voltage at 25° C. was 2.340 V, a parameter $\alpha$ which represents steepness was 1.074, and a parameter $N_{max}$ which represents a multiplex number was 196.

EXAMPLE 2

A liquid crystal composition was prepared from a first component, i.e., the following compound of the formula (I):

| | |
|---|---|
| 4-[trans-4-(3-butenyl)cyclohexyl]benzonitrile | 10%, | second components, i.e., the following six compounds of the formula (II):

| | |
|---|---|
| 4-[trans-4-(trans-4-ethylcyclohexyl)cyclohexyl]-benzonitrile | 4% |
| 4-[trans-4-(trans-4-propylcyclohexyl)cyclohexyl]-benzonitrile | 6% |
| 4-[trans-4-(trans-4-propylcyclohexyl)cyclohexyl]-1,2-diflurobenzene | 10% |
| 4-[trans-4-(trans-4-propylcyclohexyl)cyclohexyl]-fluorobenzene | 5% |
| 4-[trans-4-(trans-4-propylcyclohexyl)cyclohexyl]-toluene | 10% |
| 4-[trans-4-(trans-4-propylcyclohexyl)cyclohexyl]-propylbenzene | 15% | and fourth components, i.e., the following one compound of the formula (IV):

| | |
|---|---|
| 4-(trans-4-propylcyclohexyl)benzonitrile | 30% | and the following one compound of the formula (V):

| | |
|---|---|
| 2-(4-fluorophenyl)-5-ethylpyridine | 10%. |

Afterward, characteristics of the liquid crystal composition were measured by the same procedure as in Example 1. The results are set forth in Table 1.

EXAMPLE 3

A liquid crystal composition was prepared from a first component, i.e., the following compound of the formula (I):

| | |
|---|---|
| 4-[trans-4-(3-butenyl)cyclohexyl]benzonitrile | 10% | second components, i.e., the following five compounds of the formula (II):

| | |
|---|---|
| 4-[trans-4-(trans-4-ethylcyclohexyl)cyclohexyl]-benzonitrile | 4% |
| 4-[trans-4-(trans-4-propylcyclohexyl)cyclohexyl]-benzonitrile | 6% |
| 4-[trans-4-(trans-4-ethylcyclohexyl)cyclohexyl]-1,2-difluorobenzene | 10% |
| 4-[trans-4-(trans-4-propylcyclohexyl)cyclohexyl]-1,2-difluorobenzene | 10% |
| 4-[trans-4-(trans-4-propylcyclohexyl)cyclohexyl]toluene | 10% | and third components, i.e., the following three compounds of the formula (III):

| | |
|---|---|
| trans-4-(trans-4-methoxymethylcyclohexyl)-propylcyclohexane | 10% |
| 4-ethoxyphenyltrans-4-butylcyclohexane carboxylate | 10% |
| 4-(trans-4-propylcyclohexyl)ethoxybenzene | 20% | and a fourth component, i.e., the following one compound of the formula (IV):

| | |
|---|---|
| 4-trans-4-propylcyclohexyl)benzonitrile | 10%. |

Afterward, characteristics of the liquid crystal composition were measured by the same procedure as in Example 1. The results are set forth in Table 1.

EXAMPLE 4

A liquid crystal composition was prepared from first components, i.e., the following two compounds of the formula (I):

| | |
|---|---|
| 4-[trans-4-(3-butenyl)cyclohexyl]benzonitrile | 10% |
| 4-[trans-4-(3-pentenyl)cyclohexyl]benzonitrile | 10% | second components, i.e., the following eight compounds of the formula (II):

| | |
|---|---|
| 4-[trans-4-(trans-4-ethylcyclohexyl)cyclohexyl]-benzonitrile | 5% |
| 4-[trans-4-(trans-4-propylcyclohexyl)cyclohexyl]-benzonitrile | 6% |
| 4-[trans-4-(trans-4-ethylcyclohexyl)cyclohexyl]-1,2-difluorobenzene | 10% |
| 4-[trans-4-(trans-4-propylcyclohexyl)cyclohexyl]-1,2-difluorobenzene | 10% |
| 4-[trans-4-(trans-4-propylcyclohexyl)cyclohexyl]-methoxybenzene | 4% |
| 4-[trans-4-(trans-4-propylcyclohexyl)cyclohexyl]-fluorobenzene | 4% |
| 4-[trans-4-(trans-4-propylcyclohexyl)cyclohexyl]-toluene | 6% |
| 4-[trans-4-(trans-4-propylcyclohexyl)cyclohexyl]-propylbenzene | 6% | and third components, i.e., the following three compounds of the formula (III):

| | |
|---|---|
| 4-ethyl-4'-methyldiphenylacetylene | 5% |
| 4,4'-dibutyldiphenylacetylene | 5% |
| 4-hexyl-4'-methyldiphenylacetylene | 5% | and a fourth component, i.e., the following compound of the formula (IV):

| | |
|---|---|
| 4-trans-4-propylcyclohexyl)-2-fluorobenzonitrile | 14%. |

Afterward, characteristics of the liquid crystal composition were measured by the same procedure as in Example 1. The results are set forth in Table 1.

EXAMPLE 5

A liquid crystal composition was prepared from first components, i.e., the following two compounds of the formula (I):

| | |
|---|---|
| 4-[trans-4-(3-butenyl)cyclohexyl]benzonitrile | 10% |
| 4-[trans-4-(3-pentenyl)cyclohexyl]benzonitrile | 10% | second components, i.e., the following eight compounds of the formula (II):

| | |
|---|---|
| 4-[trans-4-(trans-4-ethylcyclohexyl)cyclohexyl]-benzonitrile | 5% |
| 4-[trans-4-(trans-4-propylcyclohexyl)cyclohexyl]-benzonitrile | 6% |
| 4-[trans-4-(trans-4-ethylcyclohexyl)cyclohexyl]-1,2-difluorobenzene | 7% |
| 4-[trans-4-(trans-4-propylcyclohexyl)cyclohexyl]-1,2-difluorobenzene | 7% |
| 4-[trans-4-(trans-4-propylcyclohexyl)cyclohexyl]-methoxybenzene | 4% |
| 4-[trans-4-(trans-4-propylcyclohexyl)cyclohexyl]-fluorobenzene | 4% |
| 4-[trans-4-(trans-4-propylcyclohexyl)cyclohexyl]-toluene | 7% |
| 4-[trans-4-(trans-4-propylcyclohexyl)cyclohexyl]-propylbenzene | 10% | and third components, i.e., the following four compounds of the formula (III):

| | |
|---|---|
| 4-ethyl-4'-methyldiphenylacetylene | 5% |
| 4,4'-dibutyldiphenylacetylene | 5% |
| 4-hexyl-4'-methyldiphenylacetylene | 5% |
| 4-hexyl-4'-ethyldiphenylacetylene | 5% | and fourth components, i.e., the following two compounds of the formula (IV):

| | |
|---|---|
| 4'-ethyl-4-cyanobiphenyl | 6% |
| 4-(trans-4-ethylcyclohexyl)benzonitrile | 4%. |

Afterward, characteristics of the liquid crystal composition were measured by the same procedure as in Example 1. The results are set forth in Table 1.

EXAMPLE 6

A liquid crystal composition was prepared from a first component, i.e., the following compound of the formula (I):

| | |
|---|---|
| 4-[trans-4-(3-butenyl)cyclohexyl]benzonitrile | 15% | second components, i.e., the following four compounds of the formula (II):

| | |
|---|---|
| 4-[trans-4-(trans-4-ethylcyclohexyl)cyclohexyl]-benzonitrile | 4% |
| 4-[trans-4-(trans-4-propylcyclohexyl)cyclohexyl]-benzonitrile | 6% |
| 4-[trans-4-(trans-4-propylcyclohexyl)cyclohexyl]-2-fluorobenzonitrile | 10% |
| 4-[trans-4-(trans-4-propylcyclohexyl)cyclohexyl]-toluene | 10% | a third component, i.e., the following compound of the formula (III):

| | |
|---|---|
| 4-(trans-4-propylcyclohexyl)ethoxybenzene | 20% | fourth components, i.e., the following two compounds of the formula (V):

| | |
|---|---|
| 2-(4-fluorophenyl)-5-ethylpyrimidine | 5% |
| 2-(3,4-difluorophenyl-5-propylpyrimidine | 10% | and compounds other than the first to fourth components, i.e., the following compounds other than the formulae (I) to (X):

| | |
|---|---|
| 2-[4-(trans-4-propylcyclohexyl)phenyl]-5-ethylpyrimidine | 10% |
| 2-[4-(trans-4-propylcyclohexyl)phenyl]-5-propylpyrimidine | 10%. |

Afterward, characteristics of the liquid crystal composition were measured by the same procedure as in Example 1. The results are set forth in Table 1.

EXAMPLE 7

A liquid crystal composition was prepared from first components, i.e., the following two compounds of the formula (I):

| | |
|---|---|
| 4-[trans-4-(3-butenyl)cyclohexyl]benzonitrile | 10% |
| 4-[trans-4-(3-pentenyl)cyclohexyl]benzonitrile | 10% | second components, i.e., the following seven compounds of the formula (II):

| | |
|---|---|
| 4-[trans-4-(trans-4-ethylcyclohexyl)cyclohexyl]-benzonitrile | 5% |
| 4-[trans-4-(trans-4-propylcyclohexyl)cyclohexyl]-benzonitrile | 6% |
| 4-[trans-4-(trans-4-propylcyclohexyl)cyclohexyl]-1,2-difluorobenzene | 9% |
| 4-[trans-4-(trans-4-propylcyclohexyl)cyclohexyl]-methoxybenzene | 4% |
| 4-[trans-4-(trans-4-propylcyclohexyl)cyclohexyl]-fluorobenzene | 4% |
| 4-[trans-4-(trans-4-propylcyclohexyl)cyclohexyl]-toluene | 6% |
| 4-[trans-4-(trans-4-propylcyclohexyl)cyclohexyl]-propylbenzene | 6% | third components, i.e., the following three compounds of the formula (III):

| | |
|---|---|
| 4-ethyl-4'-methyldiphenylacetylene | 5% |
| 4,4'-dibutyldiphenylacetylene | 5% |
| 4-hexyl-4'-methyldiphenylacetylene | 5% | a fourth component, i.e., the following compound of the formula (IV):

| | |
|---|---|
| 4'-ethyl-4-cyanobiphenyl | 10% | and compounds other than the first to fourth components, i.e., the following two compounds other than the formulae (I) to (X):

| | |
|---|---|
| 2-(4-ethylphenyl)-5-methylpyrimidine | 7% |
| 2-(4-ethylphenyl)-5-ethylpyrimidine | 8%. |

Afterward, characteristics of the liquid crystal composition were measured by the same procedure as in Example 1. The results are set forth in Table 1.

COMPARATIVE EXAMPLE

For comparison, a liquid crystal composition was prepared from the following known prevalent compounds:

| | |
|---|---|
| 4'-ethyl-4-cyanobiphenyl | 15% |
| 4'-butyl-4-cyanobiphenyl | 10% |
| 4-butoxyphenyltrans-4-propylcyclohexane carboxylate | 16% |
| 4-ethoxyphenyltrans-4-butylcyclohexane carboxylate | 12% |
| 4-methoxyphenyltrans-4-pentylcyclohexane carboxylate | 12% |
| 4-ethoxyphenyltrans-4-propylcyclohexane carboxylate | 10% |
| 4-ethoxyphenyltrans-4-pentylcyclohexane carboxylate | 10% |
| 4'-(trans-4-pentylcyclohexyl)-4-cyanobiphenyl | 15%. |

Afterward, characteristics of the liquid crystal composition were measured by the same procedure as in Example 1. The results are set forth in Table 1.

TABLE 1

| Characteristics | Example 1 | 2 | 3 | 4 | 5 | 6 | 7 | Comp. Ex. 1 |
|---|---|---|---|---|---|---|---|---|
| Clearing Point (°C.) | 118.6 | 93.4 | 81.5 | 90.2 | 92.4 | 98.0 | 77.4 | 78.8 |
| Optical Anisotropy | 0.132 | 0.115 | 0.090 | 0.130 | 0.140 | 0.136 | 0.150 | 0.142 |
| Viscosity (20° C.) (cp) | 28.2 | 19.2 | 14.7 | 22.2 | 21.2 | 20.1 | 18.9 | 33.9 |
| $V_{10}$ (25° C.) (V) | 2.340 | 1.950 | 2.340 | 1.990 | 2.250 | 1.910 | 1.970 | 2.03 |
| α (25° C.) | 1.074 | 1.075 | 1.076 | 1.079 | 1.080 | 1.087 | 1.085 | 1.12 |
| $N_{max}$ (25° C.) | 196 | 191 | 187 | 173 | 169 | 144 | 151 | 79 |

Possibility of Industrial Utilization

The effect of the present invention is to improve the steepness of voltage-transmittance characteristics in a supertwisted birefringence effect mode, keeping up properties required for a liquid crystal composition used in the above-mentioned mode, above all, a high clearing point, a low viscosity and controllable Δn in good balance.

In the liquid crystal element of a multiplex drive mode, it is desirable that a value of the steepness α which is defined by the formula (I) is close to 1, and in the present invention, the further small value α can be obtained. This is considered to be greatly attributable to not only the first and second component compounds but also the third and fourth component compounds. Furthermore, when the first and second component compounds or the first to fourth component compounds are used in a proper ratio, the α value and the above-mentioned other characteristics can be maintained in desirable balance. This fact can be apparently elucidated by comparing the results of the above examples with those of the comparative examples.

Since the liquid crystal composition of the present invention and the liquid crystal display element using the liquid crystal composition have the above-mentioned characteristics, a multiplex drive of 1/100 duty or more of high contrast due to the supertwisted birefringence effect mode can be obtained by making use of the above-mentioned composition. In addition, it is natural that the high clearing point, the low viscosity and the like of the liquid crystal composition permit using this composition in a 90° twisted TN mode in which the steepness is not required particularly.

We claim:

1. A liquid crystal composition for use in a SBE comprising as a first component, a compound represented by the formula (I)

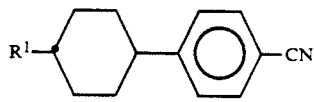 (I)

wherein $R^1$ is an alkenyl group having 2 to 8 carbon atoms, as a second component, a compound represented by the formula (II)

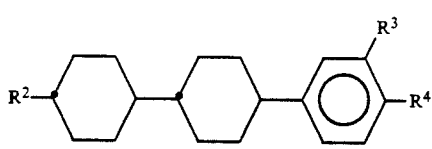 (II)

wherein $R^2$ is an alkyl group having 1 to 8 carbon atoms, $R^3$ is H or F and $R^4$ is an alkoxy group, an alkyl group, each having 1 to 8 carbon atoms, F or CN group and, as a third component, at least one compound represented by the formula (III)

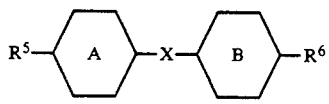 (III)

wherein $R^5$ is an alkyl group or an alkoxymethyl group, each having 1 to 8 carbon atoms, $R^6$ is an alkyl group, an alkoxy group, each having 1 to 8 carbon atoms or F,

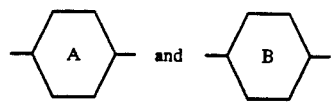

each independently represents

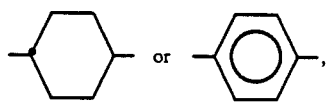

and X is a single bond, —COO— or —C≡C—, and the proportion of the first component is from 10 to 50% by weight, that of the second component is from 30 to 60% by weight, and that of the third component is from 15 to 40% by weight.

2. A liquid crystal composition according to claim 1 wherein the second component is at least on member selected from the group consisting of compounds represented by the formula

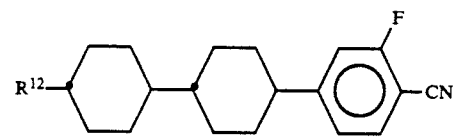

wherein $R^{12}$ is an alkyl group having 1 to 8 carbon atoms, and compounds represented by the formula

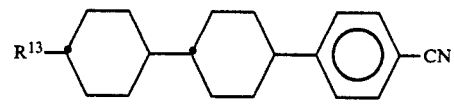

wherein $R^{13}$ is an alkyl group having 1 to 8 carbon atoms.

3. A liquid crystal composition according to claim 1 which further comprises as a fourth component, at least one member selected from the group consisting of compounds represented by the formula (IV)

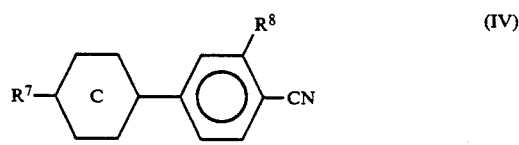 (IV)

wherein $R^7$ is an alkoxy group or an alkyl group each having 1 to 8 carbon atoms, $R^8$ is H or F, and

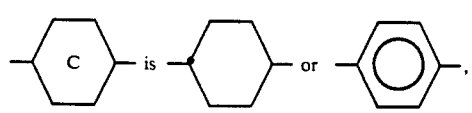

and compounds represented by the formula (V)

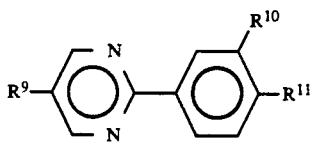

wherein $R^9$ is an alkyl group having 1 to 8 carbon atoms, $R^{10}$ is H or F, and $R^{11}$ is F, in addition to the first, second and third components.

4. A liquid crystal composition according to claim 3 wherein the proportion o the first component is from 10 to 50% by weight, that of the second component is from 30 to 60% by weight, that of the third component is from 15 to 40% by weight, and that of the fourth component is from 10 to 40% by weight.

5. A liquid crystal composition according to claim 3 which further comprises as the fourth component, at least one member selected from the group consisting of compounds represented by the formula

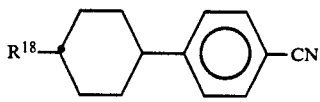

wherein $R^{18}$ is an alkyl group having 1 to 8 carbon atoms.

6. A liquid crystal display element containing the liquid crystal SBE mode composition described in any claim 1.

7. A liquid crystal SBE mode display element containing the liquid crystal composition described in claim 2.

8. A liquid crystal SBE mode display element containing the liquid crystal composition described in claim 3.

9. A liquid crystal SBE mode display element containing the liquid crystal composition described in claim 4.

10. A liquid crystal SBE mode display element containing the liquid crystal composition described in claim 5.

11. A liquid crystal composition for use in a SBE mode comprising as a first component, a compound represented by the formula (I)

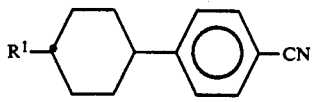

wherein $R^1$ is an alkenyl group having 2 to 8 carbon atoms, as a second component, a compound represented by the formula

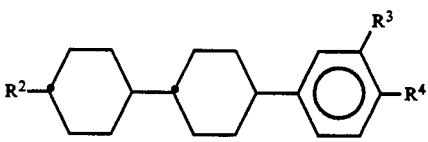

wherein $R^2$ is an alkyl group having 1 to 8 carbon atoms, $R^3$ is H or F and $R^4$ is an alkoxy group, an alkyl group, each having 1 to 8 carbon atoms, F or CN group and, as a third component, at least one member selected from the group consisting of compounds represented by the formula

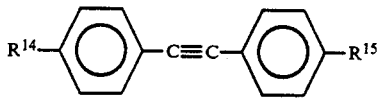

wherein each of $R^{14}$ and $R^{15}$ is an alkyl group having 1 to 8 carbon atoms, and compounds represented by the formula

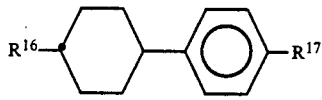

wherein $R^{16}$ is an alkyl group having 1 to 8 carbon atoms, and $R^{17}$ is an alkoxy group having 1 to 8 carbon atoms, and the proportion of the first component is from 10 to 50% by weight, that of the second component is from 30 to 60% by weight, and that of the third component is from 15 to 40% by weight.

12. A liquid crystal SBE mode display element containing the liquid crystal composition described in claim 11.

* * * * *

UNITED STATES PATENT AND TRADEMARK OFFICE
CERTIFICATE OF CORRECTION

PATENT NO. : 5,262,084
DATED : November 16, 1993
INVENTOR(S) : SAWADA et al.

It is certified that error appears in the above-indentified patent and that said Letters Patent is hereby corrected as shown below:

In item [57], Abstract, please delete the entire abstract and replace it with the following:

--A liquid crystal composition for use in a SBE mode is provided which comprises, as a first component, a compound represented by the formula (I)

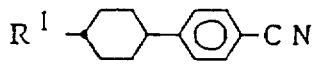

(I)

wherein $R^1$ is an alkenyl group having 2 to 8 carbon atoms, as a second component, a compound represented by the formula (II)

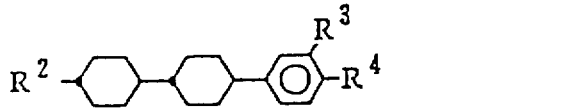

(II)

wherein $R^2$ is an alkyl group having 1 to 8 carbon atoms, $R^3$ is H or F and $R^4$ is an alkoxy group, an alkyl group, each having 1 to 8 carbon atoms, F or CN group and, as a third component, at least one compound represented by the formula (III)

UNITED STATES PATENT AND TRADEMARK OFFICE
CERTIFICATE OF CORRECTION

PATENT NO. : 5,262,084
DATED : November 16, 1993
INVENTOR(S) : SAWADA et al.

It is certified that error appears in the above-indentified patent and that said Letters Patent is hereby corrected as shown below:

$$R^5-\langle A \rangle-X-\langle B \rangle-R^6 \qquad (III)$$

wherein $R^5$ is an alkyl group or an alkoxymethyl group, each having 1 to 8 carbon atoms, $R^6$ is an alkyl group, an alkoxy group, each having 1 to 8 carbon atoms or F, $-\langle A \rangle-$ and $-\langle B \rangle-$ each independently represents a cyclohexylene or phenylene, and X is a single bond, -COO- or -C≡C-. The proportion of the first component is from 10 to 50% by weight, that of the second component is from 30 to 60% by weight, and that of the third component is from 15 to 40% by weight. --, In item [56], References Cited, under U.S. Patent Documents, insert:
--4,877,549  10/1989  Sawada et al.  252/299.63--,
--4,822,519  4/1989  Saito et al.  252/277.61--,

UNITED STATES PATENT AND TRADEMARK OFFICE
CERTIFICATE OF CORRECTION

PATENT NO. : 5,262,084

DATED : November 16, 1993

INVENTOR(S) : SAWADA et al.

It is certified that error appears in the above-indentified patent and that said Letters Patent is hereby corrected as shown below:

Column 14, line 16, change "—COO— or —≡C—" to
-- —COO— or —C≡C— --,
Column 14, line 23, change "on" to --one--,
Column 15, line 14, change "o" to --of--.

Signed and Sealed this

Twenty-second Day of November, 1994

Attest:

BRUCE LEHMAN

Attesting Officer

Commissioner of Patents and Trademarks